US006675215B1

(12) United States Patent
Cedola

(10) Patent No.: US 6,675,215 B1
(45) Date of Patent: Jan. 6, 2004

(54) AUTOMATIC BAUD RATE DETECTION OF NULL MODEM UNIMODEM CLIENT CONNECTION

(75) Inventor: Kent D. Cedola, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/507,480

(22) Filed: Feb. 17, 2000

(51) Int. Cl.$^7$ ................................................ G06F 15/16
(52) U.S. Cl. ........................ 709/227; 379/93; 379/97; 709/228; 709/229; 709/203
(58) Field of Search .................. 709/203, 227, 709/228, 229; 463/42; 379/93, 97, 2

(56) References Cited

U.S. PATENT DOCUMENTS

| | | | | |
|---|---|---|---|---|
| 5,049,875 A | * | 9/1991 | DeLuca et al. ............ | 340/7.58 |
| 5,402,473 A | * | 3/1995 | Takai et al. ............... | 379/93.33 |
| 5,490,209 A | * | 2/1996 | Kennedy et al. ......... | 379/93.08 |
| 6,072,827 A | * | 6/2000 | Krulce ....................... | 375/225 |
| 6,074,345 A | * | 6/2000 | van Oostrom et al. ...... | 600/300 |

* cited by examiner

Primary Examiner—Zarni Maung
Assistant Examiner—Sahera Halim
(74) Attorney, Agent, or Firm—Lee & Hayes, PLLC

(57) ABSTRACT

A baud rate detection system and method automatically detects the baud rate at which a client computing device is communicating with a host computer over a serial connection. The host computer is coupled to the client computing device via a serial connection, which employs a Unimodem null serial protocol. The baud rate detection system includes a baud rate selector to select among multiple baud rates that the client computing device might use to transmit a predefined message (e.g., a text string "C", "L", "I", "E", "N", "T"). The system also includes a message detector to listen at the currently selected baud rate for the predefined message. If the message detector receives the message, the current baud rate is the correct rate and is used for continuing communications with the client computing device. On the other hand, if the message detector fails to detect the message after a predetermined time period or detects characters not included in the predefined message, the baud rate selector chooses a new baud rate and the message detector begins listening at the new baud rate. This process continues until the baud rate detection system finds the appropriate baud rate for communicating with the client computing device.

8 Claims, 2 Drawing Sheets

AUTOMATIC BAUD RATE DETECTION OF NULL MODEM UNIMODEM CLIENT CONNECTION

TECHNICAL FIELD

This invention relates to computer operating systems, and particularly, to computer methods for detecting baud rates for communicating with client devices over a serial null modem connection that uses a Unimodem null serial protocol.

BACKGROUND

Handheld computing devices have grown rapidly in popularity in recent years. These devices enable users to port many of the tools and features of their desktop computers on excursions away from home or the office. While these devices offer tremendous advantages for portability, most mobile users still rely on desktop computers when working at home or the office.

As a result of operating multiple computers, users often enter different information into different computers depending upon their situation and location. For instance, a user may enter tasks or other data into a work computer, appointments and contact information into a portable computer while on the road, and calendar events into a home computer when at home. Yet, when the user wants to see their schedule, the user wants to view the most up-to-date schedule, regardless of where the information was entered or where the user accesses it.

To avoid making the user enter the same data multiple times into different computers, most handheld computers are configured to swap information with desktop computers. Programs executing on one or both computers synchronize the exchange of schedules, appointments, and other data contents so that any unique information currently residing on one of the computers is shared with the other to bring both computers up to date.

Typically, handheld computers connect to a host desktop computer via a serial connection. One common serial connection is known as a "null modem connection", which uses a Unimodem null serial protocol to exchange data. According to this protocol, the handheld computer initiates communication by sending a message called "CLIENT". The host computer replies with a message "S", "E", "R", "V", "E", "R", "C", "L", "I", "E", "N", "T". If both sides understand the transmission, a synchronization session is begun to synchronize the contents of the two computers.

One problem surrounding this serial protocol is that the message exchange is baud rate dependent. That is, both the handheld computer and the host computer must be operating at the same baud rate for each to understand the other's message. However, there are many different baud rates at which the two computers may communicate. For example, handheld computers that run the Windows CE operating system from Microsoft Corporation can support four different baud rates: 19.2K, 38K, 56K, and 115K. If the handheld computer is operating at one baud rate (e.g., 19.2K) and the host computer is operating at another baud rate (e.g., 56K), the two computers will not be able to communicate with one another. Unfortunately, connection failures due to serial baud rate mismatches tend to be common.

When a baud rate mismatch occurs, the user typically tries to adjust the baud rate of one of the computers. It tends to be harder to change the baud rate on the host computer, so the user generally ends up manually reconfiguring the handheld computer to a different baud rate.

Another problem is that an increasing number of users own more than one handheld computer. In some cases, the handheld computers may be set to different baud rates, whereas the host computer can be set to only one of these baud rates at a given time. As a result, the user is forced to adjust baud rates more often to accommodate the multiple portable devices.

Thus, there is a need for an improved system and method for connecting handheld computers to host computers over a null modem unimodem client connection.

SUMMARY

This invention concerns a baud rate detection system and method for automatically detecting the baud rate at which a client computing device is communicating with a host computer over a serial connection.

In one implementation, the host computer is coupled to the client computing device via a serial connection, which employs a Unimodem null serial protocol to exchange data. The baud rate detection system includes a baud rate selector to select among multiple baud rates that the client computing device might use to transmit a predefined message (e.g., a text string "C", "L", "I", "E", "N", "T"). The system also includes a message detector to listen at the currently selected baud rate for the predefined message.

During operation, after the client connects to the host computer, the baud rate selector chooses a first baud rate from among the multiple possible baud rates. The message detector listens at this baud rate for the message. If the message detector receives the message, the current baud rate is the correct rate and is used for continuing communications with the client computing device. On the other hand, if the message detector fails to detect the message after a predetermined time period or detects characters not included in the predefined message, the baud rate selector chooses a new baud rate and the message detector begins listening at the new baud rate. This process continues until the baud rate detection system finds the appropriate baud rate for communicating with the client computing device.

The automatic baud rate detection is advantageous because it effectively eliminates connection failures caused by baud rate mismatches. This obviates the need for a user to manually reconfigure either the host or client computing device when baud rate mismatches occur.

DETAILED DESCRIPTION

Figure 1:
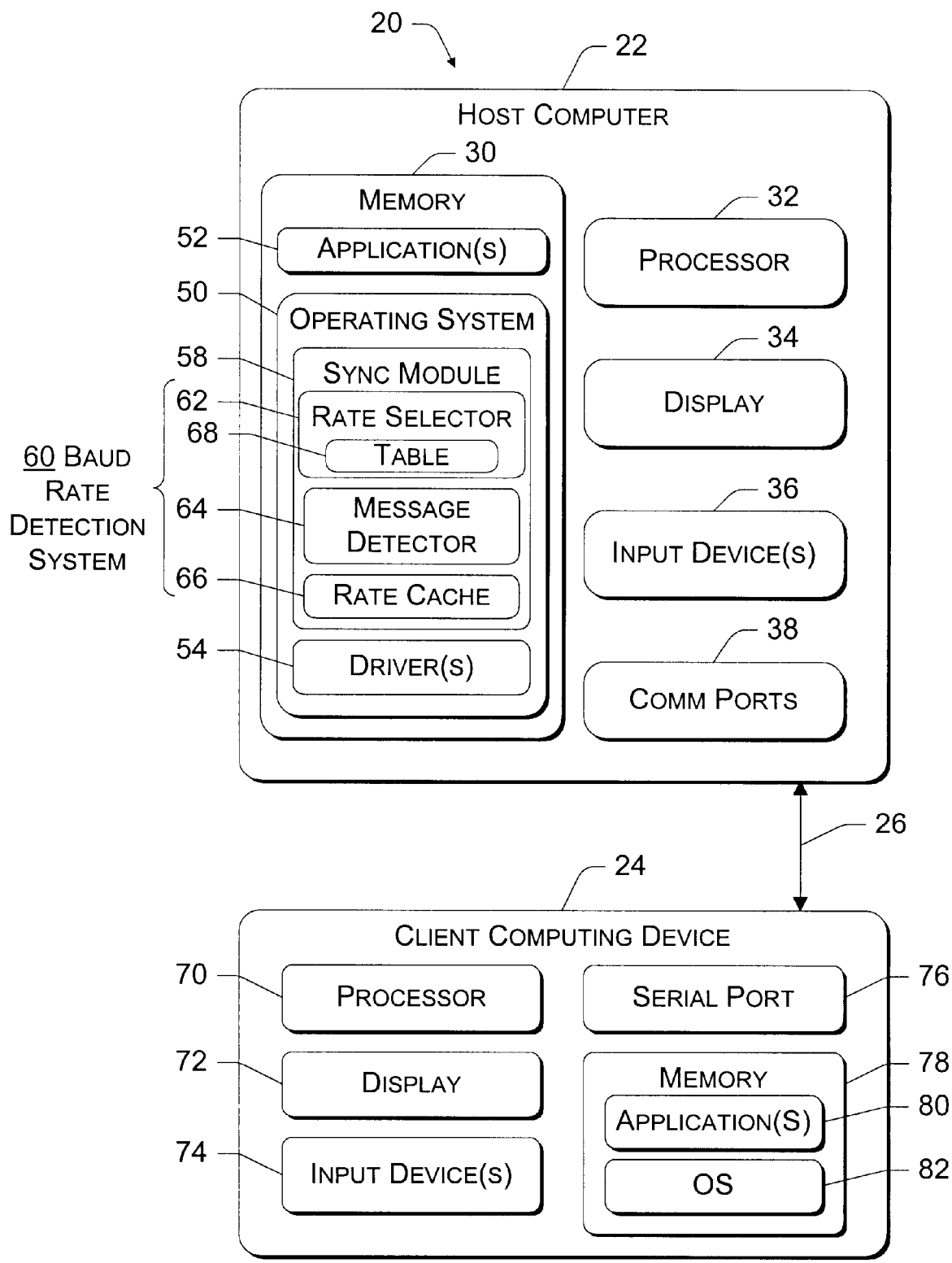
FIG. 1 is a block diagram of a host computer connected to a client computing device, such as a handheld computer.

FIG. 1 shows a computer system 20 having a host computer 22 connected to a client computing device 24 via a serial connection 26, The host computer 22 may be embodied in many ways including, for example, a workstation, a desktop computer, a laptop computer, or the like. The client computing device 24 may also be implemented in a number of ways, such as a handheld computer, a telephone or other communication device, a personal digital assistant, and so forth. The serial connection 26 preferably employs a null modem Unimodem client protocol, which establishes a connection between the host computer 22 and client computing device 24. Once the connection is established (as described below), the system uses known protocols such as PPP, IP, and TCP to exchange data over the serial connection.

The host computer 22 has a memory 30, a processor 32, a display 34, one or more input devices 36 (e.g., keyboard, mouse, USB connections, etc.), and multiple communication (COMM) ports 38. The memory 30 generally includes both volatile memory (e.g., RAM) and non-volatile memory (e.g., Flash, ROM, hard disk, etc.).

An operating system 50 resides in memory 30 and executes on the processor 32. The host computer 22 preferably runs a Windows-brand operating system from Microsoft Corporation, such as Win32-based products (e.g., Windows 95, Windows 98, etc.), although other operating systems may be used. One or more application programs 52 are loaded into memory 30 and run on the operating system 50. Examples of applications 52 include email programs, scheduling programs, word processing programs, Internet browser programs, and so on. The operating system 50 has a set of drivers 54 to manage COMM ports 38, as well as peripheral devices connected through the COMM ports and/or various hardware components.

The operating system 50 has a synchronization module 58 to facilitate serial communication between the host computer 22 and the client computing device 24 and to synchronize the contents on each machine. The applications 52 call the synchronization module 58 via an API (application programming interface). For instance, a scheduling program on the host computer 22 calls the synchronization module 58 to facilitate the exchange of appointments and tasks between the two computers to bring both computers up to date. As an exemplary implementation, the synchronization module 58 is implemented as part of the Windows CE Services module in the Windows CE operating system.

The synchronization module 58 is configured to facilitate serial communication using the Unimodem null serial protocol. According to this protocol, the client computing device 24 initiates a communication session by sending over a message consisting of the text string "C", "L", "I", "E", "N", "T" and the host computer 22 replies with a message ""S", "E", "R", "V", "E", "R", "C", "L", "I", "E", "N", "T"". As part of the configuration, the synchronization module 58 implements a baud rate detection system 60 that automatically detects a baud rate at which the client computing device 24 is transmitting data. The baud rate detection system 60 automatically cycles through a set of possible baud rates and at each rate, listens to detect the message text string "C", "L", "I", "E", "N", "T" from the client computing device 24.

The baud rate detection system 60 includes a rate selector 62, a message detector 64, and a rate cache 66. The rate selector 62 selects among multiple baud rates at which the client computing device may transmit the message over the serial connection. The baud rates may be stored, for example, in a table 68.

Once a baud rate is selected, the message detector 64 listens to the serial channel at the selected baud rate. If no message is received within a predetermined time period, or only error characters are received (i.e., characters not in the message "C", "L", "I", "E", "N", "T"), the rate selector 62 selects a next baud rate from the table 68 and the message detector 64 listens to the serial channel at this next baud rate. Eventually, the rate selector 62 picks a baud rate that enables the message detector 64 to successfully receive the text string "C", "L", "I", "E", "N", "T". Once this occurs, the rate selector 62 sets the baud rate at the current rate for future communication with the client. The rate selector also caches the baud rate in cache 66 for use in subsequent client connects under the assumption that it is likely that the host computer will communicate again with the same client computing device at the same baud rate. This process is described below in more detail with reference to FIG. 2.

With continuing reference to FIG. 1, the client computing device 24 is illustrated as having a processor 70, a display 72, one or more input devices 74 (e.g., keypad, touchpad, microphone, etc.), a serial port 76, and a memory 78. The memory 78 represents both volatile and non-volatile memory, and is used to store programs 80 and an operating system 82. As an exemplary implementation, the operating system is the Windows CE operating system from Microsoft Corporation. The Windows CE operating system supports four different baud rates: 19.2K, 38K, 56K, and 115K.

Figure 2:
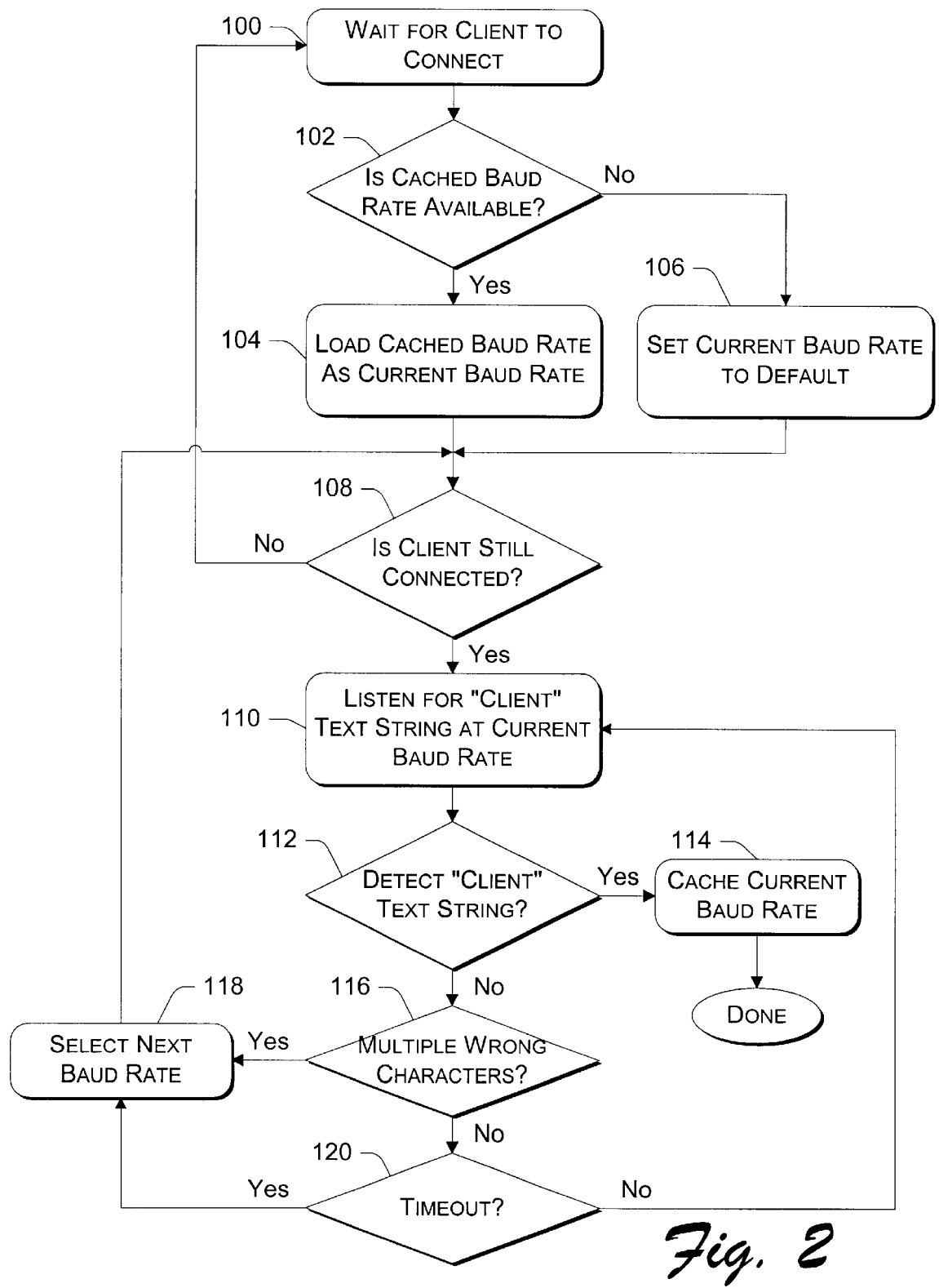
FIG. 2 is a flow diagram of a method for automatically detecting a baud rate at which the client computing device is transmitting data.

FIG. 2 shows a method for automatically detecting a baud rate at which the client computing device 24 is transmitting data. These steps are performed, for example, in software by the baud rate detection system 60 at the host computer 22.

At step 100, the baud rate detection system 60 waits for the client computing device to connect. This connection may be a physical connection, in which the client computing device is attached to a serial cable or placed in a cradle. The connection may alternatively be non-physical, such as an IR (infrared) connection or an RF (radio frequency) connection.

Once a connection is made, the rate selector 62 determines whether there is a baud rate currently cached in rate cache 66 (step 102). If there is (i.e., the "yes" branch from step 102), the rate selector loads the cached baud rate as the current baud rate (step 104). If not (i.e., the "no" branch from step 102), the rate selector 62 sets the current baud rate to a default rate identified in the baud rate table 68 (step 106).

At step 108, the baud rate detection system 60 checks if the client computing device 24 is still connected. If not, it returns to the wait state at step 100. Assuming that client is still connected (i.e., the "yes" branch from step 108), the message detector 64 begins listening at the current baud rate for the "C-L-I-E-N-T" text string to be transmitted from the client computing device (step 110).

At this point, there are three possibilities: (1) the host receives the correct message; (2) the host receives error characters that are not in the text string "C", "L", "I", "E", "N", "T"; or (3) the host receives no characters within a prescribed timeout period. Decision steps 112, 116, and 120 address these three possibilities. At step 112, the message detector 64 determines whether it receives the "C", "L", "I", "E", "N", "T" text string. If it does (i.e., the "yes" branch), the host computer 22 is using the same baud rate as the client computing device 24 and hence no further adjustment to the baud rate is needed. The rate selector 62 caches the current baud rate into the rate cache 66 for future use during the next connection and the process is completed. At this point, the host computer 22 responds to the client computing device with a response message ""S", "E", "R", "V", "E", "R", "C", "L", "I", "E", "N", "T"", which is transmitted at the current baud rate.

Suppose, however, that the message detector 64 begins detecting error characters instead of the text string "C", "L", "I", "E", "N", "T" (i.e., the "no" branch from step 112 and the "yes" branch from step 116). Such error characters may occur through aliasing or other artifacts as a result of transmitting at one baud rate and detecting at a different baud rate. In this case, the message detector 64 knows immediately that it is using the wrong baud rate and rate selector 64 can, select the next baud rate in the baud rate table 68 without waiting for the timeout period to elapse. The process then continues at step 108.

Next, suppose that the message detector 64 detects neither the text string ("C", "L", "I", "E", "N", "T") nor error characters (i.e., the "no" branch from step 112 and the "no" branch from step 116). In this case, the host computer may or may not be operating at a compatible baud rate. One possible explanation is that the client computing device has not yet sent over the message. Another possible explanation is that the host is indeed operating at an incompatible baud rate. To rule out the former explanation, the message detector 64 listens for a predetermined timeout period, such as 20 seconds. If the message detector 64 fails to detect the text string or error characters within this timeout period (i.e., the "yes" branch from step 120), the rate selector 62 selects the next baud rate in the baud rate table 68 and the process continues at step 108.

To provide an example of this process, suppose that the client computing device 24 is set to a baud rate of 19.2K. In addition, suppose that the baud rate table 68 lists four baud rates in the following order: (1) 56K, (2) 19.2K, (3) 115K, and (4) 38K. The rate selector initially selects the default rate of 56K. The message detector 64 listens at 56K, but fails to detect the text string ("C", "L", "I", "E", "N", "T") being transmitted at 19.2K. Accordingly, either upon receiving error characters or upon expiration of the timeout period, the rate selector 62 automatically selects the next baud rate of 19.2K. Since this is now the baud rate used by the client computing device 24, the message detector 64 will detect the text string ("C", "L", "I", "E", "N", "T"). The rate selector 62 caches the 19.2K rate in cache 66 and the process is completed. system and process described above is advantageous because it enables automatic detection of the client baud rate. As a result, connection failures caused by baud rate mismatches are effectively eliminated. This obviates the need for a user to manually reconfigure either the host or client computing device when baud rate mismatches occur.

Although the description above uses language that is specific to structural features and/or methodological acts, it is to be understood that the invention defined in the appended claims is not limited to the specific features or acts described. Rather, the specific features and acts are disclosed as exemplary forms to of implementing the invention.

What is claimed is:

1. A baud rate detection system comprising:

a baud rate selector to select among multiple baud rates at which a client computing device may transmit data over a serial connection to a host computer using a Unimodem null serial protocol; and a message detector to listen at a currently selected baud rate for a predefined message sent from the client computing device, and in an event that the message is detected, the message detector is configured to use the currently selected baud rate for future communication wit the client computing device, whereas in an event that the message is not detected, the message detector is configured to listen at a next baud rate selected by the baud rate selector.

2. A baud rate detection system of claim 1, wherein the baud rate selector cycles through the multiple baud rates sequentially.

3. A baud rate detection system of claim 1, wherein the baud rates are stored in a table, and the baud rate selector is configured to retrieve the baud rates from the table.

4. A baud rate detection system of claim 1, wherein the baud rate selector initially selects a default baud rate.

5. A baud rate detection system of claim 1, further comprising a cache, and the baud rate selector is configured to store, in the cache, the baud rate that permits detection of the message.

6. A baud rate detection system of claim 5, wherein the baud rate selector initially selects the baud rate in the cache for a subsequent connection between the host computer and a client computing device.

7. A baud rate detection system of claim 1, wherein the message detector receives characters that are not part of the predefined message and in response, the baud rate selector selects the next baud rate.

8. A baud rate detection system of claim 1, wherein the message detector is configured to wait for a predetermined timeout period, and in an event that the timeout period expires before the predefined message is detected, the baud rate selector selects the next baud rate.

\* \* \* \* \*

UNITED STATES PATENT AND TRADEMARK OFFICE
CERTIFICATE OF CORRECTION

PATENT NO. : 6,675,215 B1
DATED : January 6, 2004
INVENTOR(S) : Cedola

It is certified that error appears in the above-identified patent and that said Letters Patent is hereby corrected as shown below:

Column 2,
Line 60, replace "," with a -- . -- between "26" and "The".

Column 5,
Line 35, insert -- The -- between "." and "system".

Column 6,
Line 2, delete "to" between "forms" and "of".
Line 15, replace "wit" with -- with --.

Signed and Sealed this

Twenty-second Day of June, 2004

JON W. DUDAS
*Acting Director of the United States Patent and Trademark Office*